(12) United States Patent
Klein et al.

(10) Patent No.: US 10,973,089 B2
(45) Date of Patent: Apr. 6, 2021

(54) HEATABLE LAMINATED SIDE PANE

(71) Applicant: SAINT-GOBAIN GLASS FRANCE, Courbevoie (FR)

(72) Inventors: Marcel Klein, Baesweiler (DE); Benjamin Krebs, Bochum (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 694 days.

(21) Appl. No.: 15/546,157

(22) PCT Filed: Dec. 2, 2015

(86) PCT No.: PCT/EP2015/078303
§ 371 (c)(1),
(2) Date: Jul. 25, 2017

(87) PCT Pub. No.: WO2016/119950
PCT Pub. Date: Aug. 4, 2016

(65) Prior Publication Data
US 2018/0343705 A1    Nov. 29, 2018

(30) Foreign Application Priority Data

Jan. 26, 2015  (EP) .................................... 15152463

(51) Int. Cl.
*H05B 3/86* (2006.01)
*B32B 17/10* (2006.01)
*B60J 1/12* (2006.01)

(52) U.S. Cl.
CPC ......... *H05B 3/86* (2013.01); *B32B 17/10036* (2013.01); *B32B 17/10192* (2013.01);
(Continued)

(58) Field of Classification Search
CPC ........ B32B 17/10036; B32B 17/10192; B32B 17/10229; B32B 17/10761; B60J 1/12;
(Continued)

(56) References Cited

U.S. PATENT DOCUMENTS 2,761,945 A * 9/1956 Colbert .................... H01B 1/00
219/536
2,932,710 A * 4/1960 Coale ................ B32B 17/10045
219/547

(Continued)

FOREIGN PATENT DOCUMENTS

CN         101653038 A      2/2010
DE       101 26 869 A1     12/2002
(Continued)

OTHER PUBLICATIONS

International Search Report as issued in International Patent Application No. PCT/EP2015/078303, dated Feb. 25, 2016.

*Primary Examiner* — Jimmy Chou
(74) *Attorney, Agent, or Firm* — Pillsbury Winthrop Shaw Pittman LLP (57) ABSTRACT

A heatable laminated side pane for an openable side window of a vehicle, with an upper edge, a lower edge, a front edge, and a rear edge, includes an outer pane and an inner pane, which panes are bonded to one another via a thermoplastic intermediate layer, and a transparent, heatable coating, which is arranged between the outer pane and the inner pane and which is electrically contacted by a first collecting rail and a second collecting rail and which has, for guiding a heating current flowing between the collecting rails, at least one decoated isolating line that runs between the collecting rails, wherein the first collecting rail and the second collecting rail are arranged along the front edge or the rear edge.

20 Claims, 3 Drawing Sheets (52) U.S. Cl.
CPC .. *B32B 17/10229* (2013.01); *B32B 17/10761* (2013.01); *B60J 1/12* (2013.01); *H05B 2203/011* (2013.01); *H05B 2203/013* (2013.01); *H05B 2203/017* (2013.01)

(58) Field of Classification Search
CPC ........ H05B 2203/011; H05B 2203/013; H05B 2203/017; H05B 3/86
USPC ........ 219/200–203, 522, 528, 544–549, 543, 219/541, 542
See application file for complete search history.

(56) References Cited

U.S. PATENT DOCUMENTS

| | | | | | |
|---|---|---|---|---|---|
| 3,196,255 | A | * | 7/1965 | Beauchamp | G05D 23/2456 219/497 |
| 3,475,595 | A | * | 10/1969 | Leclercq | B32B 17/10376 219/522 |
| 3,612,745 | A | * | 10/1971 | Warren | H05B 3/84 174/268 |
| 3,729,616 | A | * | 4/1973 | Gruss | B29C 70/56 219/522 |
| 3,789,191 | A | * | 1/1974 | Spindler | B32B 17/10174 338/24 |
| 3,789,192 | A | * | 1/1974 | Spindler | H05B 3/84 219/522 |
| 3,813,519 | A | * | 5/1974 | Jochim | G01R 31/50 219/522 |
| 3,983,527 | A | * | 9/1976 | Ohsato | B60S 1/00 338/35 |
| 4,081,581 | A | * | 3/1978 | Littell, Jr. | B32B 17/10018 428/138 |
| 4,419,570 | A | * | 12/1983 | Kalbskopf | H05B 3/84 219/203 |
| 4,552,932 | A | * | 11/1985 | Schollenberger | C08F 299/06 522/90 |
| 4,634,242 | A | * | 1/1987 | Taguchi | G02B 7/1815 219/203 |
| 4,707,586 | A | * | 11/1987 | Voss | B32B 17/10036 219/203 |
| 4,788,784 | A | * | 12/1988 | Templin | G09F 15/02 211/57.1 |
| 4,874,930 | A | * | 10/1989 | Voss | B32B 17/10 219/522 |
| 4,876,178 | A | * | 10/1989 | Voss | B32B 17/10036 430/314 |
| 4,920,254 | A | * | 4/1990 | DeCamp | B64C 1/1492 219/203 |
| 5,075,535 | A | * | 12/1991 | Hans | C03C 17/3411 219/203 |
| 5,448,037 | A | * | 9/1995 | Takase | B32B 17/10174 219/547 |
| 5,493,102 | A | * | 2/1996 | Takase | B32B 17/10 219/547 |
| 5,750,267 | A | * | 5/1998 | Takase | B32B 17/10 428/469 |
| 5,877,473 | A | * | 3/1999 | Koontz | B32B 17/10036 219/203 |
| 6,008,473 | A | * | 12/1999 | Gillner | H05B 3/84 219/202 |
| 6,011,244 | A | * | 1/2000 | Castle | B32B 17/10036 219/522 |
| 6,316,752 | B1 | * | 11/2001 | Smetana | F42B 3/198 219/543 |
| 6,906,287 | B2 | * | 6/2005 | Sol | B32B 17/10036 15/250.05 |
| 7,129,444 | B2 | * | 10/2006 | Weiss | H05B 3/84 219/203 |
| 7,200,921 | B2 | * | 4/2007 | Loibl | B32B 17/10036 219/203 |
| 7,534,500 | B2 | * | 5/2009 | Kobayashi | B32B 7/02 428/457 |
| 8,283,612 | B2 | * | 10/2012 | Keite-Telgenbuescher | H05B 3/34 219/548 |
| 2003/0116551 | A1 | * | 6/2003 | Sol | B32B 17/10192 219/203 |
| 2003/0183620 | A1 | * | 10/2003 | Wong | H05B 3/34 219/549 |
| 2004/0159645 | A1 | * | 8/2004 | Gillner | B32B 17/10761 219/203 |
| 2007/0029309 | A1 | * | 2/2007 | Keite-Telgenbuscher | C09J 11/04 219/549 |
| 2007/0108175 | A1 | * | 5/2007 | Andrt | B32B 17/10788 219/203 |
| 2008/0035629 | A1 | * | 2/2008 | Thiry | B32B 17/10174 219/203 |
| 2010/0059365 | A1 | * | 3/2010 | Valentin | B82Y 20/00 204/280 |
| 2010/0200286 | A1 | * | 8/2010 | Melcher | G02F 1/155 174/261 |
| 2010/0270280 | A1 | * | 10/2010 | Blanchard | B32B 17/10036 219/203 |
| 2011/0017725 | A1 | * | 1/2011 | Figurelli | H05B 3/84 219/546 |
| 2011/0017726 | A1 | * | 1/2011 | Choi | C03C 17/34 219/552 |
| 2011/0062146 | A1 | * | 3/2011 | Kuriki | H05B 3/84 219/553 |
| 2011/0272394 | A1 | * | 11/2011 | Chun | H05B 3/10 219/546 |
| 2011/0297661 | A1 | * | 12/2011 | Raghavan | H05B 3/84 219/203 |
| 2014/0027434 | A1 | * | 1/2014 | Reul | H05B 3/84 219/203 |
| 2014/0083991 | A1 | * | 3/2014 | Choi | H01C 17/06 219/203 |
| 2016/0174295 | A1 | * | 6/2016 | Klein | H05B 3/84 219/203 |
| 2018/0098386 | A1 | * | 4/2018 | Masschelein | H05B 3/84 |

FOREIGN PATENT DOCUMENTS

| | | |
|---|---|---|
| DE | 10 2004 029 164 A1 | 12/2005 |
| DE | 603 15 158 T2 | 4/2008 |
| EP | 1 404 153 A1 | 3/2004 |
| EP | 2 399 735 A1 | 12/2011 |
| JP | 2008-508667 A | 3/2008 |
| JP | 2013-532115 A | 8/2013 |
| KR | 10-0855013 B1 | 8/2008 |
| WO | WO 03/105533 A1 | 12/2003 |
| WO | WO 2005/055667 A2 | 6/2005 |
| WO | WO 2006/010698 A1 | 2/2006 |

\* cited by examiner

HEATABLE LAMINATED SIDE PANE

CROSS-REFERENCE TO RELATED APPLICATIONS

This application is the U.S. National Stage of PCT/EP2015/078303, filed Dec. 2, 2015, which in turn claims priority to European patent application number 15152463.4 filed Jan. 26, 2015. The content of these applications are incorporated herein by reference in their entireties.

The invention relates to a heatable laminated side pane, a method for its production, and its use.

Motor vehicles typically have openable side windows. Such side windows are provided with a side pane that can be moved by substantially vertical displacement, by which means the side window can be opened and closed.

Side panes can be designed as laminated safety panes that comprise an outer pane and an inner pane that are bonded to one another via a thermoplastic intermediate layer, typically a PVB film. Also known are heatable laminated side panes that are equipped with heating wires. The heating wires are embedded in the thermoplastic intermediate layer. Typically, collecting rails (also referred to as collecting conductors or busbars) are provided for the electrical contacting of the heating wires. Suitable collecting rails are, for example, strips of a copper foil that are connected to an external voltage source. The heating wires run between the collecting rails such that a current can flow through the heating wires, by which means the heating action is obtained. Such side panes are known, for example, from DE10126869A1 or WO2005055667A2.

Also known are side panes that are heated by a transparent coating instead of by a heating wire. The coatings comprise electrically conductive layers, based in particular on silver. The coatings are likewise electrically contacted with two collecting rails, between which a current flows through the heatable coating. However, due to the complex shape of side panes, it is possible to arrange the collecting rails parallel to one another such that a homogeneous heating field is formed in the see-through region of the pane. In order to nevertheless guide the current paths between the collecting rails as uniformly as possible over the see-through region of the pane, it is customary to pattern the coating by means of line-shaped decoated regions. Such side panes are known, for example, from DE102004029164A1, WO03/105533A1, and WO2006010698A1.

As is evident from the aforementioned prior art, the common practice, until now, has been to arrange the collecting rails of a heatable, laminated side pane along the lower edge of the side pane, which is always covered by the motor vehicle body. Thus, the electrical contacting of the heatable pane always remains hidden. Obviously, the opinion prevails that, in the opened state of the side window, collecting rails along side edges other than the lower edge, in particular along the front edge, are visible to the observer, a situation unacceptable for aesthetic reasons.

The prior art heatable side panes with the collecting rails along the lower edge have a number of disadvantages. The physical proximity of the two collecting rails with opposing polarity requires complicated isolating measures to permanently prevent short circuits. Moreover, the heating wires or patterned segments of the coating must be routed meanderingly starting from the lower edge over the pane back to the lower edge in order to heat the pane over its entire surface. Such a meandering course can be undesirable for aesthetic reasons. Moreover, with sharp local bends of the heating wire, locations with local overheating can form (so-called "hotspots").

The object of the present invention is to provide an improved heatable, laminated side pane.

The object of the present invention is accomplished according to the invention by a heatable laminated side pane in accordance with claim 1. Preferred embodiments emerge from the subclaims.

The heatable laminated side pane according to the invention is provided for an openable side window of a vehicle. This means a side window that can be opened and closed by substantially vertical displacement of the side pane into the vehicle door.

The heatable laminated side pane has an upper edge, a lower edge, a front edge, and a rear edge. The term "upper edge" denotes the side edge of the side pane that points upward in the installed position. "Lower edge" denotes the side edge that points toward the groand in the installed position. "Front edge" denotes the side edge that is directed forward in the driving direction. "Rear edge" denotes the side edge that is directed toward the rear in the driving direction.

The heatable laminated side pane comprises at least an outer pane and an inner pane that are bonded to one another via a thermoplastic intermediate layer. "Inner pane" denotes the pane that faces the interior of the vehicle in the installed position. "Outer pane" denotes the pane that faces the external surroundings of the vehicle in the installed position.

According to the invention, a transparent, heatable coating that is electrically contacted by means of a first collecting rail and a second collecting rail is arranged between the outer pane and the inner pane. The collecting rails are provided to be connected to an external voltage source such that, during operation, a heating current flows through the heatable coating between the collecting rails. The coating thus functions as a heating layer and heats the side pane as a result of its electrical resistance, for example, to deice the side pane or to free it from moisture condensation.

The heatable coating has, for guiding the heating current, at least one decoated isolating line, usually a plurality of decoated isolating lines. In the context of the invention, the term "isolating line" means a line-shaped region that is not electrically conductive within the electrically conductive coating. The isolating line preferably extends over the entire thickness of the electrically conductive coating, but at least over the entire thickness of the electrically conductive layer(s) of the coating. The isolating line is preferably introduced into the electrically conductive coating by means of a laser and produced by laser-induced degeneration within the electrically conductive coating. Such laser-induced degeneration is, for example, ablation of the electrically conductive layer or a chemical modification of the electrically conductive layer. By means of the laser-induced degeneration, an interruption of the electrical conductivity of the layer is achieved. The isolating line can, however, in principle, also be formed by other methods, for example, mechanical abrasion.

The isolating line or the isolating lines run between the collecting rails. This means that each isolating line runs without interruption from the first collecting rail to the second collecting rail. The electrically conductive coating is divided by the isolating lines into different segments separated from one another, which are also referred to in the following as heating strips. The current flow between the collecting rails occurs only within the respective heating strips while adjacent heating strips are electrically isolated from one another and, consequently, no current flow can occur between adjacent heating strips. These heating strips make it possible to selectively shape the path of the current flow between the first collecting rail and the second collecting rail, which is necessary due to the complex shapes of conventional side windows to ensure homogeneous current distribution and, hence, heating effect.

According to the invention, the first collecting rail and the second collecting rail are arranged along the front edge or the rear edge of the side pane. In the context of the invention, a collecting rail is arranged along a side edge when it is less distant from the side edge (the mean distance to said side edge is less than to all other side edges) and its lengthwise direction substantially follows the direction of the side edge.

The invention is based on the surprising finding that collecting rails can be arranged even along the front edge and the rear edge of a side pane without being visible to the observer in the opened state of the pane. As long as the distance of the collecting rails from the edge is not too great, the collecting rails are advantageously hidden by body parts of the vehicle door as well as by the sealing lips customarily used with vehicle windows. The electrical contacting is thus visible in no state of the window, resulting in the fact that the side pane meets the aesthetic requirements for motor vehicle windows.

In an advantageous embodiment, all isolating lines run between the collecting rail along the front edge and the collecting rail along the rear edge. There are no isolating lines that run, for example, from a collecting rail along the front or rear edge to the lower edge of the pane, along which, for example, an extension of a collecting rail is arranged. By means of the consistent course of all isolating lines between the front and the rear edge, a particularly advantageous distribution of the heating effect is achieved.

In an advantageous embodiment, the maximum distance of the collecting rails from the side edge along which they are arranged is less than 3 cm, preferably less than 2.5 cm, particularly preferably less than 2 cm. In the context of the invention, the maximum distance is measured between the side edge of the side pane and the edge of the collecting rail facing away from it. This distance is sufficiently small such that the collecting rails are arranged with the electrical contacting in a region that is covered by vehicle body parts and sealing lips of typical motor vehicle side windows. It has surprisingly been found that with these distances the collecting rails remain advantageously concealed behind parts of the body of a typical vehicle. Consequently, the distances indicated can be considered, so to speak, as general design teaching independent of the specific motor vehicle type.

The collecting rails must, however, not be positioned too close to the side edge since, otherwise, the bonding of the panes is disturbed and air can penetrate into the laminate via the side edge. In an advantageous embodiment, the minimum distance of the collecting rails from the side edge along which they are arranged is greater than 3 mm, preferably greater than 5 mm. Good results are thus achieved. In the context of the invention, the minimum distance is measured between the side edge of the side pane and the edge of the collecting rail facing it.

In a preferred embodiment, one collecting rail is arranged along the front edge and the other collecting rail is arranged along the rear edge of the side pane. Thus, the available non-visible regions of the side pane are optimally used. In addition, the isolating lines can be routed without sharp bends and loops from the front edge to the rear edge, which is aesthetically appealing, facilitates homogeneous distribution of the heating power, and reduces the risk of local overheating.

The isolating lines can, in this case, run in a preferred embodiment without sharp bends from the first collecting rail to the second collecting rail. Due to the complex shape of side panes, at least a portion of the isolating lines will typically not run in a completely straight line between the collecting rails, in order to distribute the heating effect as much as possible over the entire pane. Thus, for example, the isolating lines will have, near the typically curved upper edge, a slight bend adapted to the upper edge. Alternatively, however, the isolating lines can also have a meander-shaped course between the collecting rails and can change its direction repeatedly like a U-turn.

In an alternative preferred embodiment, both collecting rails are arranged along the same side edge of the side pane, i.e., either along the front edge or along the rear edge. The heating strips then run loop-like starting from the first collecting rail across the pane to the second collecting rail. Both collecting rails are arranged on the heatable coating. In order not to touch each other, the collecting rails can have a different distance from the side edge along which they extend, i.e., be arranged near each other. Undesirable contact of a collecting rail with a region of the heatable coating that is associated with the other collecting rail can be prevented by suitable isolating measures. Such an isolating measure is, for example, the application of an electrically isolating film, which preferably contains polyimide (PI) and/or polyisobutylene (PIB) and has a thickness from 10 µm to 200 µm. Alternatively, the collecting rails can have, with appropriate routing of the heating paths, the same distance from the side edge, but extend along different regions of the side edge. Thus, for example, the insulating lines can be designed such that each heating path in the upper region, for example, in the upper half of the side edge, begins in the lower region, ends, for example, in the lower half of the side edge such that the first collecting rail has to be arranged only along this upper region of the side edge and the second collecting rail has to be arranged only along the lower region of the side edge. The heating strips are then arranged like enclosing loops. Alternatively, it is also possible to implement the heating strips such that they run from the front edge to the rear edge and, in each case, to connect two heating strips to one another in series using connecting elements (for example, metallic foils) such that the current path in the first heating strip runs from one edge to the other and in the second heating strip runs back again to the first edge. Also, in this manner, the coating can be electrically contacted along a single edge.

The heatable coating can be applied on a surface of the inner pane or of the outer pane. The coating is advantageously applied on a surface of the outer pane or of the inner pane facing the intermediate layer, because, there, it is protected against corrosion and other damage. Alternatively, the heatable coating can be arranged on a polymeric carrier film within the intermediate layer. The carrier film preferably contains at least polyethylene terephthalate (PET), polyethylene (PE), or mixtures or copolymers or derivatives thereof. This is particularly advantageous for the handling, the stability, and the optical properties of the carrier film. The carrier film preferably has a thickness of 5 µm to 500 µm, particularly preferably of 10 µm to 200 µm, and most particularly preferably of 12 µm to 75 µm. Carrier layers with these thicknesses can be advantageously provided in the form of flexible and, at the same time, stable films, that can be easily handled.

According to the invention, the heatable coating is transparent. In the context of the invention, a "transparent coating" means a coating that has, in the visible spectral range, transmittance of at least 50%, preferably at least 70%.

A frame-like edge region of the pane is preferably not provided with the heatable coating. This edge region is frequently also referred to as an edge decoating (in the case of a coating applied on a pane) or a cut-back (in the case of a coating on a carrier film). This ensures that the heatable coating has no contact with the surrounding atmosphere, by which means corrosion is prevented—the coating is, so to speak, encapsulated in the intermediate layer. The width of the coating-free edge region is typically from 0.5 mm to 20 mm, in particular from 1 mm to 10 mm. The pane can also include other uncoated regions, for example, data transmission windows or communication windows.

The electrically conductive coating has at least one electrically conductive layer. The coating can additionally have dielectric layers, which serve, for example, for regulation of the sheet resistance, for corrosion protection, or for reducing reflection. The conductive layer preferably contains silver or an electrically conductive oxide (transparent conductive oxide, TCO), such as indium tin oxide (ITO). The conductive layer preferably has a thickness of 10 nm to 200 nm. Thus, a good compromise between transparency and electrical conductivity of the layer is achieved. To improve the conductivity with, at the same time, high transparency, the coating can have a plurality of electrically conductive layers, which are separated from one another by at least one dielectric layer. The conductive coating can include, for example, two, three, or four electrically conductive layers. Typical dielectric layers contain oxides or nitrides, for example, silicon nitride, silicon oxide, aluminum nitride, aluminum oxide, zinc oxide, or titanium oxide.

In a particularly preferred embodiment, the electrically conductive coating has at least one electrically conductive layer, which contains silver, preferably at least 99% silver. The layer thickness of the electrically conductive layer is preferably from 5 nm to 50 nm, particularly preferably from 10 nm to 30 nm. The coating preferably has two or three of these conductive layers, which are separated from one another by at least one dielectric layer. Such coatings are particularly advantageous in terms of the transparency of the pane, on the one hand, and its conductivity, on the other.

The width of the isolating lines is preferably less than or equal to 500 µm, particularly preferably from 10 µm to 250 µm, most particularly preferably from 20 µm to 150 µm. Isolating lines with this width can be produced easily, in particular by laser processing, ensure the electrical isolation of adjacent heating strips, and are, moreover, visually inconspicuous.

The heatable coating typically has a plurality of isolating lines, i.e., at least two isolating lines. The exact number and distance between the isolating lines depends in the individual case on the exact shape of the pane and can be determined by the person skilled in the art by preliminary considerations and simulations. The distance between adjacent isolating lines is preferably from 1 cm to 10 cm, preferably from 2 cm to 6 cm. This is advantageous as well in terms of the visual inconspicuousness of the isolating lines. Moreover, effective heating power is ensured by heating strips of this width. The aforementioned values are suitable in particular for side panes of passenger cars. However, for larger side panes, for example, of trucks, significantly larger distances can be selected, for example, from 5 cm to 30 cm. The number of isolating lines is typically from 2 to 10, in particular from 3 to 7. In one embodiment of the invention, all heating strips have the same width. The isolating lines are then advantageously distributed uniformly and inconspicuously over the pane.

In an advantageous embodiment of the invention, the heating power (surface power density $P_S$) increases from the rear edge to the front edge at least in sections. This is achieved in particular due to the fact that the distance between adjacent isolating lines decreases in the course from the rear edge to the front edge at least in sections, the width of the heating strips thus decreases. As a result, the heating current in the front region of the pane is distributed over a smaller heating strip width than in the rear region, by which means the heating power is increased. A higher heating power in the front pane region can be desirable for front side panes. The front side pane region can thus be freed of ice or moisture more quickly, as a result of which the view of the side mirrors is cleared more quickly. Preferably, the maximum width of progressively narrowing heat strips is from 55 mm to 110 mm (preferably from 60 mm to 100 mm), the minimum width is from 10 mm to 55 mm (preferably from 10 mm to 50 mm). With these values, a good compromise between quick deicing in the front region in order to quickly clear the view of the side mirrors and the deicing of the entire pane, which is also important in the context of traffic safety.

In an advantageous embodiment of the invention, the average heating power (surface power density $P_S$) of the pane is at least 250 W/m², preferably at least 300 W/m², particularly preferably at least 350 W/m². Advantageous heating action is thus achieved.

In an advantageous embodiment, the collecting rails are implemented as strips of an electrically conductive foil. The conductive foil preferably contains aluminum, copper, tinned copper, gold, silver, zinc, tungsten, and/or tin or alloys thereof, particularly preferably copper. The thickness of the electrically conductive foil is preferably from 10 µm to 500 µm, particularly preferably from 30 µm to 200 µm, for example, 50 µm or 100 µm. Collecting rails made of electrically conductive foils with these thicknesses are technically simple to realize and have an advantageous current carrying capacity. The electrically conductive foil can be electrically conductively connected to the heatable coating directly via a soldering compoand or an electrically conductive adhesive. Collecting rails comprising strips of a conductive foil are suitable in particular when the electrically conductive coating is arranged on a carrier film in the intermediate layer, but can also be used with coatings on a pane surface. To improve the conducting connection, a silver-containing paste can, for example, be arranged between the conductive coating and collecting rail.

In an alternative advantageous embodiment, the collecting rails are implemented as a printed and fired conductive structure. The printed collecting rails contain at least one metal, preferably silver. The electrical conductivity is preferably realized through metal particles contained in the collecting conductor, particularly preferably through silver particles. The metal particles can be situated in an organic and/or inorganic matrix such as pastes or inks, preferably as a fired screen printing paste with glass frits. The layer thickness of the printed collecting rails is preferably from 5 µm to 40 µm, particularly preferably from 8 µm to 20 µm, and most particularly preferably from 10 µm to 15 µm. Printed collecting rails with these thicknesses are technically easy to realize and have advantageous current-carrying capacity. Printed collecting rails are suitable in particular when the electrically conductive coating is applied on a surface of the outer pane or of the inner pane.

The length of the collecting rails depends on the design of the side pane, in particular on the length of the edge along which the collecting rail is arranged, and can be appropriately selected in the individual case by the person skilled in the art. The "length" of the typically strip-shaped collecting rails means their longer dimension, along which they are customarily contacted with the different heating strips sections.

The heating power can be influenced at a given applied voltage U (usually specified by the vehicle manufacturer) and sheet resistance $R_S$ and length of the collecting rails by the width of the collecting rails. Good results are usually obtained in a collecting rail width range from 1 mm to 20 mm, preferably from 2 mm to 10 mm.

In a preferred embodiment of the invention, the connection of the connecting cable to the external voltage supply is done in the region of the lower edge. Thus, the connecting cables can be hidden in the motor vehicle body. The side pane has, for this, preferably at least one supply line, which is electrically contacted with a collecting rail and runs, starting from the collecting rails, to the lower edge. Preferably, each collecting rail is provided with such a supply line. The supply lines can, for example, run in the form of a straight section to the lower edge in order to be contacted there (for example, in the region of the projection of the collecting rail on the lower edge). The supply lines can already end within the laminate, i.e., before reaching the lower edge, and be contacted with a flat conductor. Alternatively, the supply lines can extend beyond the lower edge for contacting with the external connecting cables outside the laminate.

The ends of the supply lines opposite the collecting rails have, in a preferred embodiment, a distance from each other less than or equal to 30 mm, particularly preferably less than or equal to 20 mm, most particularly preferably less than or equal to 12 mm. The supply lines can also have, when the collecting raps are arranged on different edges of the side pane, a section that is arranged along the lower edge. Thus, the connection points of the external connecting cables for both collecting rails can be routed in physical proximity to one another, a situation advantageous for the electrical connection.

The supply line can be implemented, like the collecting rails, preferably as strips of an electrically conductive film or as fired printing paste. In one embodiment, the collecting rails and the supply lines are formed from the same material, which simplifies the production of the pane and is optimum for the transfer of electricity between the collecting rail and the supply line (because of the same electrical resistance). It is, however, also possible to contact collecting rails formed by screenprinting using conductive films as connecting elements.

The sheet resistance of the electrically conductive coating is preferably from 0.3 ohm/square to 7 ohm/square. Thus, advantageous heating powers are obtained with voltages customarily used in the automotive sector, with low sheet resistances resulting in higher heating power with application of the same voltage.

The outer pane and/or the inner pane preferably contains glass, in particular soda lime glass, or plastics, preferably rigid plastics, in particular polycarbonate, or polymethyl methacrylate.

The thickness of the panes can vary widely and thus be ideally adapted to the requirements in the individual case. Preferably, these thicknesses of the outer pane and of the inner pane are from 0.5 mm to 10 mm and preferably from 1 mm to 5 mm, most particularly preferably from 1.4 mm to 3 mm.

The outer pane, the inner pane, or the intermediate layer can be clear and colorless, but also tinted, opacified, or colored. The outer outer pane and the inner pane can be made of non-prestressed, partially prestressed, or prestressed glass.

The intermediate layer is formed by at least one thermoplastic bonding film. The thermoplastic bonding film contains at least one thermoplastic polymer, preferably ethylene vinyl acetate (EVA), polyvinyl butyral (PVB), or polyurethane (PU) or mixtures or copolymers or derivatives thereof, particularly preferably PVB. The thickness of the thermoplastic bonding film is preferably from 0.2 mm to 2 mm, particularly preferably from 0.3 mm to 1 mm, for example, 0.38 mm or 0.76 mm.

If the heatable coating is arranged on a carrier film, this carrier film is preferably arranged between two thermoplastic bonding films. The intermediate layer then comprises at least two thermoplastic bonding films and a carrier film with an electrically heatable coating arranged therebetween.

Typical heatable coatings also have infrared-(IR)-reflecting properties. Consequently, not only the heating function but, at the same time, an IR-reflecting functionality is provided by the coating according to the invention. Thermal comfort is improved by the reduced entry of thermal radiation into the vehicle interior.

The invention further includes a method for producing a heatable laminated side pane according to the invention, at least comprising
  (a) Providing the outer pane, the inner pane, and the intermediate layer,
  (b) Providing the heatable coating on a surface of the outer pane or of the inner pane or on a carrier film,
  (c) Introducing the isolating lines in the heatable coating,
  (d) Contacting the heatable coating using the collecting rails,
  (e) Arranging the intermediate layer between an outer pane and an inner pane,
  (f) Bonding the outer pane to the inner pane via the intermediate layer by lamination.

If the coating is applied on a surface of one of the panes, the stack is arranged in step (e) such that the coating faces the intermediate layer. If the coating is provided on a carrier film, this carrier film is preferably arranged in step (e) between a first thermoplastic film and a second thermoplastic film. Together with the carrier film, the thermoplastic films form the intermediate layer.

The heatable coating is applied using methods known per se. Preferably, the coating is done by magnetic field enhanced cathodic sputtering. This is particularly advantageous in terms of simple, quick, economical, and uniform coating of the substrate. Carrier films with heatable coatings are also commercially available such that the coated carrier film does not have to be produced in-house.

The introduction of the isolating lines is preferably done by laser processing, but can, in principle, also be done using other methods, for example, mechanical abrasion. The patterning of conductive layers is well known to the person skilled in the art.

The mounting of the collecting rails can be done, in particular, by placement, printing, soldering, or gluing. The intermediate layer is provided in the form of at least one film.

The production of the composite glass by lamination is done with customary methods known per se to the person skilled in the art, for example, autoclave methods, vacuum bag methods, vacuum ring methods, calender methods, vacuum laminators, or combinations thereof. The bonding of the outer pane and the inner pane is customarily done through the action of heat, vacuum, and/or pressure.

The side pane according to the invention is preferably used in means of transportation for travel on land, in the air, or on water, in particular in motor vehicles.

In the following, the invention is described in detail with reference to drawings and exemplary embodiments. The drawings are schematic representations and not true to scale. The drawings in no way restrict the invention.

They depict.

Figure 1:
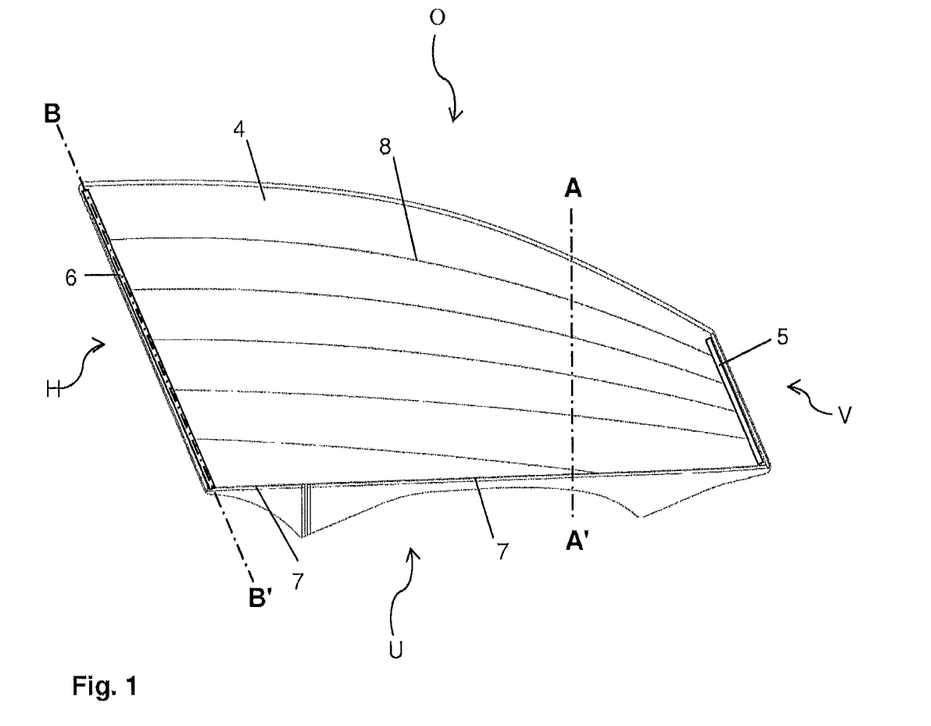
FIG. 1 a plan view of an embodiment of the side pane according to the invention, FIG. 2 a section along A-A' through the side pane of FIG. 1, FIG. 3 a section along B-B' through the side pane of FIG. 1, FIG. 4 a flowchart of an embodiment of the method according to the invention.
Figure 2:
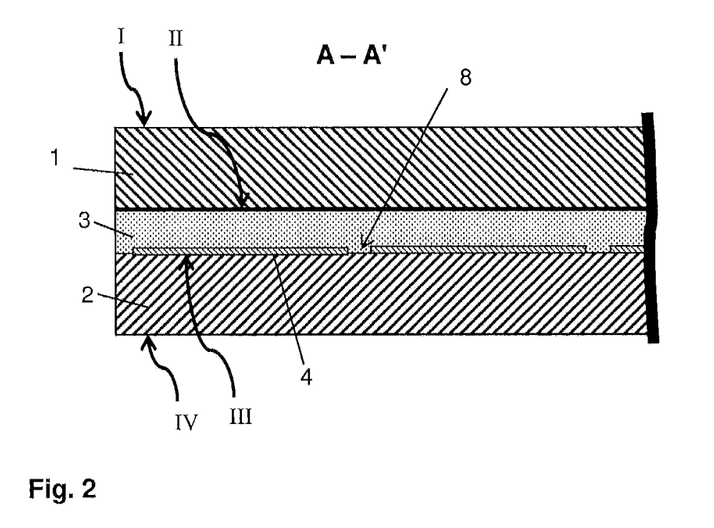
Figure 3:
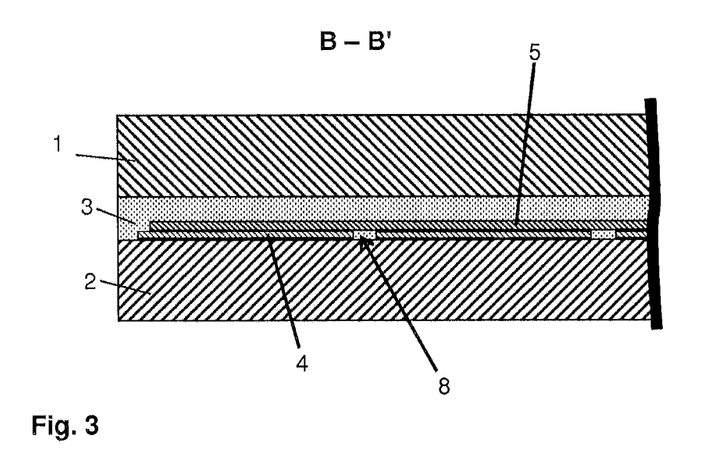

FIG. 1, FIG. 2, and FIG. 3 depict in each case a detail of an embodiment of the heatable laminated side pane according to the invention. The side pane for the front side window of an automobile which can be opened by lowering the side pane. The side pane has a front edge V, a rear edge H, an upper edge O, and a lower edge U. The edges are referred to according to the installed position in the direction of travel.

The side pane is a laminated glass composed of an outer pane 1, an inner pane 2, and an intermediate layer 3 that bonds the two planes to one another. The outer pane 1 and the inner pane 2 are made of soda lime glass and have, for example, a thickness, in each case, of 2.1 mm. The intermediate layer 3 is formed by a film made of PVB with a thickness of 0.76 mm.

The outer pane 1 has an outer surface I and an inner surface II. The inner pane 2 likewise has an outer surface III and an inner surface IV. The term "outer surface" refers to the surface that is intended to be turned toward the external environment in the installed position. The term "inner surface" refers to the surface that is intended to be turned toward the vehicle interior in the installed position. The inner surface II of the outer pane 1 and the outer surface III of the inner pane 2 are turned toward one another and the intermediate layer 3.

A transparent, heatable coating 4 is applied on the outer surface III of the inner pane 2. The heatable coating has, for example, two silver layers and further dielectric layers above, below, and between the silver layers to increase transparency and reduce sheet resistance. For generating the heating action, the coating 4 is electrically contacted by means of a first collecting rail 5 and a second collecting rail 6. The collecting rails 5,6 are, for example, formed by a printed and fired screen printing paste containing silver particles and glass frits and have a width of 8 mm and a thickness of 100 μm. When a voltage is applied to the collecting rails 5, 6, a current flows through the coating 4, creating the heating action. The voltage can be the usual motor vehicle on-board voltage of 14 V, or even a voltage of, for example, 42 V or 48 V.

The heatable coating 4 is divided by isolating lines 8 into different segments (heating strips). This serves to guide the heating current, enabling the most homogeneous heating of the pane possible. Otherwise, due to the complex shape of typical side panes substantial parts of the pane remain unheated since the current would take the shortest path between the collecting rails 5,6.

The first collecting rail 5 runs along the front edge V of the side pane; the second collecting rail 6 runs along the rear edge H. The maximum distance of the collecting rails from the edge along which they run is, for example, 2 cm. Contrary to the previously prevailing opinion concerning the design of generic side panes, the collecting rails 5, 6 are not visible to an observer even in the opened state of the side window. Instead, the collecting rails 5, 6 are covered by auto body parts and sealing lips of typical side windows. The minimum distance is, for example, 6 mm. This distance is sufficient to prevent disruption of the stability of the laminate and penetration of air.

The isolating lines 8 run without sharp curves from the first collecting rail 5 to the second collecting rail 6. Thus, local hotspots can be prevented. In addition, the design is visually appealing. The isolating lines 8 have only a slight curvature that increases as the distance from the upper edge O decreases. Thus, despite the complex pane shape with the curved upper edge O, uniform distribution of the heating power is obtained.

The distance between adjacent isolating lines 8 (in other words, the width of the heating strips) decreases in the course from the rear edge H to the front edge V. Thus, higher heating power is achieved in the region of the front edge V. Consequently, this region is deiced or freed of moisture first, as a result of which the driver quickly obtains a clear view of the side mirror. The width of the heating strips on the first collecting rail 5 (front edge) is, for example, 45 mm; on the second collecting rail 6 (rear edge), for example, 75 mm.

The side pane also has two supply lines 7. Each supply line 7 is electrically contacted to a collecting rail 5, 6 and runs to the lower edge U, where it can be contacted with a connecting cable to the external voltage supply. The supply lines can also be implemented as a silver-containing screen-print or even as conductive foil. The supply lines 7 have in each case a section that runs along the lower edge U. The ends of the supply lines 7, which are provided with the external connecting cables to the voltage supply, are guided relative to one another such that they have a distance between them of, for example, 12 mm. The small distance between them can have advantages from a connection technology standpoint.

Figure 4:
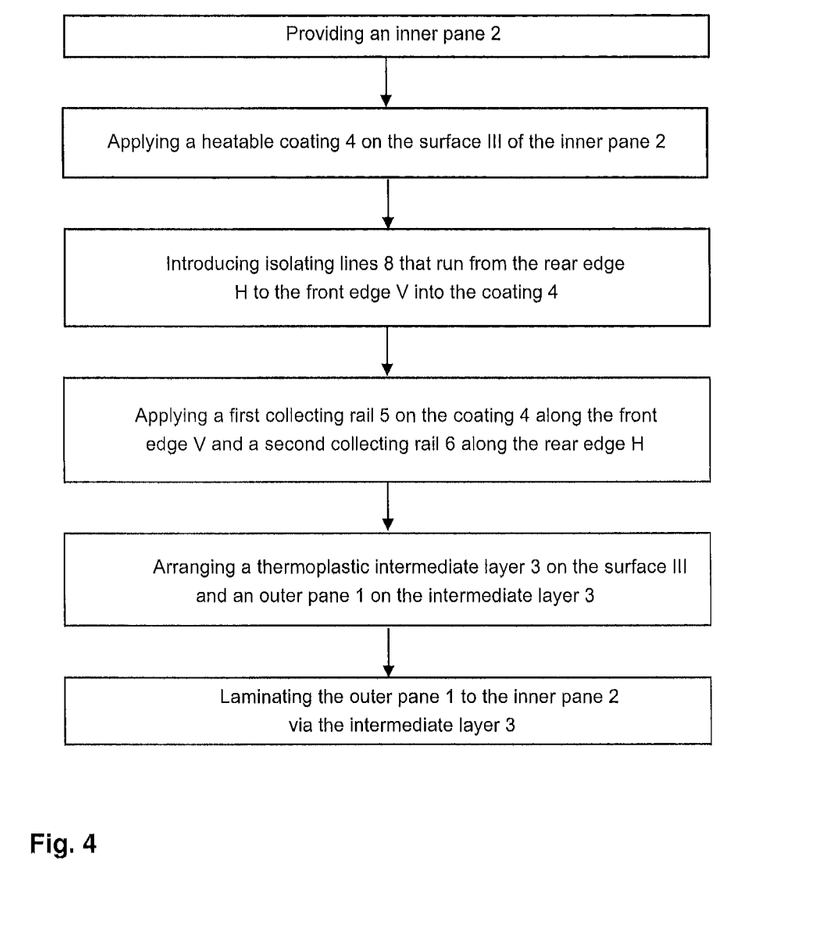

FIG. 4 depicts a flowchart of an exemplary embodiment of the method according to the invention for producing a laminated heatable side pane according to the invention.

LIST OF REFERENCE CHARACTERS (1) outer pane
(2) inner pane
(3) thermoplastic intermediate layer
(4) heatable coating
(5) first collecting rail
(6) second collecting rail
(7) supply line
(8) isolating line
H rear edge of the side pane
O upper edge of the side pane
V front edge of the side pane
U lower edge of the side pane
I outer surface of the outer pane 1
II inner surface of the outer pane 1
III outer surface of the inner pane 2
IV inner surface of the inner pane 2
A-A' section line
B-B' section line

The invention claimed is:

1. A heatable laminated side pane for an openable side window of a vehicle, with an upper edge, a lower edge, a front edge, and a rear edge, at least comprising an outer pane and an inner pane, which inner and outer panes are bonded to one another via a thermoplastic intermediate layer, and a transparent, heatable coating, which is arranged between the outer pane and the inner pane and which is electrically contacted by a first collecting rail and a second collecting rail and which has, for guiding a heating current flowing between the first and second collecting rails, a plurality of decoated isolating lines that run between the first and second collecting rails, wherein the first collecting rail and the second collecting rail are arranged along the front edge or the rear edge, wherein heating power increases, at least in one or more sections, from the rear edge to the front edge, wherein a distance between adjacent isolating lines decreases, at least in one or more sections, from the rear edge to the front edge from a maximum distance in a range between 55 mm and 110 mm to a minimum distance in a range between 10 mm and 55 mm.

2. The heatable laminated side pane according to claim 1, wherein the first collecting rail is arranged along the front edge and the second collecting rail is arranged along the rear edge.

3. The heatable laminated side pane according to claim 1, wherein the first collecting rail and the second collecting rail are arranged along the same edge.

4. The heatable laminated side pane according to claim 1, wherein a maximum distance of the first and second collecting rails from the edge along which the first and second collecting rails are arranged is less than 3 cm.

5. The heatable laminated side pane according to claim 1, wherein a minimum distance of the first and second collecting rails from the edge along which the first and second collecting rails are arranged is greater than 3 mm.

6. The heatable laminated side pane according to claim 1, wherein the heatable coating is applied on a surface of the outer pane or of the inner pane facing the intermediate layer or on a polymeric carrier film within the intermediate layer.

7. The heatable laminated side pane according to claim 1, wherein the heatable coating comprises at least one electrically conductive layer, which contains at least silver and has a thickness of 10 nm to 50 nm.

8. The heatable laminated side pane according to claim 1, wherein the heatable coating has the plurality of decoated isolating lines with a line width less than or equal to 500 µm, and wherein a distance between adjacent isolating lines is from 1 cm to 10 cm.

9. The heatable laminated side pane according to claim 1, wherein the first and second collecting rails are implemented as strips of an electrically conductive film or as fired screenprinting paste.

10. The heatable laminated side pane according to claim 1, wherein a width of the first and second collecting rails is from 1 mm to 20 mm.

11. The heatable laminated side pane according to claim 1, wherein the first and second collecting rails are electrically connected to one supply line in each case, wherein the supply lines run to the lower edge, and wherein ends of the supply lines opposite the first and second collecting rails have a distance from one another less than or equal to 30 mm.

12. The heatable laminated side pane according to claim 4, wherein the maximum distance is less than 2.5 cm.

13. The heatable laminated side pane according to claim 12, wherein the maximum distance is less than 2 cm.

14. The heatable laminated side pane according to claim 5, wherein the minimum distance is greater than 5 mm.

15. The heatable laminated side pane according to claim 7, wherein the heatable coating comprises two or three electrically conductive layers.

16. The heatable laminated side pane according to claim 8, wherein the line width is from 10 µm to 250 µm, and wherein the distance between adjacent isolating lines is from 2 cm to 6 cm.

17. The heatable laminated side pane according to claim 16, wherein the line width is from 20 µm to 150 µm.

18. The heatable laminated side pane according to claim 9, wherein the electrically conductive film contains copper, and wherein the fired screenprinting paste contains silver particles.

19. The heatable laminated side pane according to claim 10, wherein the width of the first and second collecting rails is from 2 mm to 10 mm.

20. The heatable laminated side pane according to claim 11, wherein the distance is less than or equal to 20 mm.

* * * * *